US008768923B2

(12) United States Patent
Drumm et al.

(10) Patent No.: US 8,768,923 B2
(45) Date of Patent: Jul. 1, 2014

(54) ONTOLOGY-BASED GENERATION AND INTEGRATION OF INFORMATION SOURCES IN DEVELOPMENT PLATFORMS

(75) Inventors: Christian Drumm, Karlsruhe (DE); Jens Lemcke, Karlsruhe (DE); Daniel Oberle, Durmersheim (DE); Ganapathy Subramanian, Chennai (IN); Vivek Krishnamurthy Dornal, Bangalore (IN)

(73) Assignee: SAP AG, Walldorf (DE)

( * ) Notice: Subject to any disclaimer, the term of this patent is extended or adjusted under 35 U.S.C. 154(b) by 924 days.

(21) Appl. No.: 12/181,684

(22) Filed: Jul. 29, 2008

(65) Prior Publication Data
US 2010/0031240 A1   Feb. 4, 2010

(51) Int. Cl.
*G06F 17/30* (2006.01)
(52) U.S. Cl.
CPC ............... *G06F 17/30864* (2013.01)
USPC ........... 707/736; 707/749; 707/758; 717/143
(58) Field of Classification Search
CPC .............................................. G06F 17/30864
USPC .......... 717/743, 143; 707/736, 791, 749, 758
See application file for complete search history.

(56) References Cited

U.S. PATENT DOCUMENTS

| | | | | |
|---|---|---|---|---|
| 2003/0172368 A1* | 9/2003 | Alumbaugh et al. | ......... | 717/106 |
| 2004/0083199 A1* | 4/2004 | Govindugari et al. | ............ | 707/1 |
| 2004/0093344 A1* | 5/2004 | Berger et al. | ................ | 707/102 |
| 2006/0156253 A1* | 7/2006 | Schreiber et al. | ............. | 715/835 |
| 2006/0248045 A1* | 11/2006 | Toledano et al. | ................. | 707/2 |
| 2008/0077598 A1* | 3/2008 | Wilmering et al. | ........... | 707/100 |
| 2008/0082374 A1* | 4/2008 | Kennis et al. | ..................... | 705/7 |
| 2009/0083257 A1* | 3/2009 | Bargeron et al. | ................. | 707/5 |
| 2009/0112835 A1* | 4/2009 | Elder | ............................... | 707/4 |

OTHER PUBLICATIONS

Maedche, Alexander, et al., "Ontologies for Enterprise Knowledge Management", IEEE Intelligent Systems, IEEE Computer Society, Mar./Apr. 2003, pp. 26-33.*
Choi, Namyoun, et al., "A Survey on Ontology Mapping", SIGMOD Record, vol. 35, No. 3, Sep. 2006, pp. 34-41.*
Maedche, Alexander, et al., "MAFRA—A MApping FRAmework for Distributed Ontologies", EKAW 2002, LNAI 2473, Springer-Verlag, Berlin, Germany, © 2002, pp. 235-250.*
Embley, David W., et al., "Automatically Extracting Ontologically Specified Data from HTML Tables of Unknown Structure", ER 2002, LNCS 2503, Springer-Verlag, Berlin, Germany, © 2002, pp. 322-337.*
Adams, Thomas, et al., "Semantic Integration of Heterogeneous Information Sources Using a Knowledge-Based System", *To appear in: Proc 5th Int Conf on CS and Informatics (CS&I '2000)*. http://www.cs.utexas.edu/users/pclark/papers, [Online]. Retrieved from the internet: <URL:http://www.cs.utexas.edu/users/pclark/papers/csi2000.pdf>,(2000),6 pgs.

(Continued)

*Primary Examiner* — Shahid Alam
(74) *Attorney, Agent, or Firm* — Schwegman, Lundberg & Woessner, P.A.

(57) ABSTRACT

Methods and systems to generate derivative information sources, from original information sources, use an ontology that provides a logic-based representation formalism of each of a number of original information sources, the original information sources having heterogeneous representation formalisms. The original information sources are transformed to the ontology. A number of derivative information sources, corresponding to the original information sources, may be automatically generated from the ontology.

23 Claims, 13 Drawing Sheets

(56) References Cited

OTHER PUBLICATIONS

Brown, George, et al., "Successful Application of Service-Oriented Architecture Accross the Enterprise and Beyond", *Intel Technology Journal*, vol. 8, Issue 4, 2004, [Online].Retrieved from the internet: <URL:http://www.intel.com/sites/corporate/tradmarx.htm>,(2004),345-359.

Cress, Douglas, "An Enterprise-Wide Computer Network Defense, Report Correlation Prototype", *CMSC dept. @ UMBC Prepared for CMSC 771 Theory and Practice of Knowledge Representation, Assignment # 6*, [Online]. Retrieved from the internet: <URL:http://www.cs.umbc.edu/~cress1/krep-hw-6/final-report.pdf>,(May 21, 2003),9 pgs.

Lehmann, Tobias, "A Framework for Ontology based Integration of Structured IT-Systems", [Online]. Retrieved from the Internet: <URL:http://emma.informatik.unibw-muenchen.de/_portal/_content/professorships/integratedApplications/research/publications/2007_IntegrationOfStructuredITSystems_lehmann.pdf>, 15 pgs., Jul. 29, 2008.

Madche, Alexander, et al., "Ontology-Oriented Information Extraction and Integration", *Institute AIFB, Karlsruhe University*, [Online]. Retrieved from the internet: <http://www.uni-koblenz.de/~staab/Research/Publications/ssarbruecken99.pdf>,1 pg., Jul. 29, 2008.

Spivack, Nova, "Harnessing the collective intelligence of the World-Wide Web", *Minding the Planet: Semantic Web*, [Online]. Retrieved from the internet: <URL:http://novaspivack.typepad.com/nova_spivacks_weblog/semantic_web/index.html>,(Apr. 23, 2008),13 pgs.

Wache, H., et al., "Ontology-Based Integration of information—A Survey of Existing Approaches", *Intelligent Stystems Group, Center for Computing Technologies, University of Bremen.*, [Online]. Retrieved from the internet: <URL:http://www.cs.vu.nl/~heiner/public/ois-2001.pdf>,(2001),10 pgs.

\* cited by examiner

US 8,768,923 B2

ONTOLOGY-BASED GENERATION AND INTEGRATION OF INFORMATION SOURCES IN DEVELOPMENT PLATFORMS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, SAP AG All Rights Reserved.

BACKGROUND

Current software development environments and platforms (e.g., Eclipse, Application Server environments or SAP's Business Process Platform (BPP)) present a number of technical challenges to the management of such environments and platforms for developers. These technical challenges arise from the ever increasing complexity of the system landscapes, where required information may be distributed and scattered across many information sources. These distributed information sources may contain information that is required by a developer to manage and operate a particular development environment and platform. FIG. 1 is a block diagram showing an example prior art software development environment 100 in which a developer 102 may be required to deal with a number of different and heterogeneous information sources 104, 106 and 108 that together are accessible via an information repository 110 of a software development platform. The information repository 110 may be accessed, for example, by the developer 102 utilizing a computer system 112 that is communicatively coupled to the information repository 110 via a network 114 (e.g., the Internet, a Wide Area Network (WAN) or a Local Area Network (LAN)). A developer 102 may have to deal with several information sources that use different representation formalisms, from natural language, to eXtensible Markup Language (XML), etc. Further, information regarding a particular entity may be scattered across any number of the information sources 104-108.

Because of the scattering and different representation formalisms, a number of technical challenges are presented to developers in ensuring information consistency across multiple information sources 104-108. Typically, many isolated and heterogeneous information sources in different representation formalisms may have to be maintained by the developer 102. This is particularly problematic when the multiple information sources describe a common artifact. Considering, for example, business objects that form a part of an integrated Enterprise Resource Planning (ERP) software system, the structure of business objects may be represented in one information source in XML, while being represented in natural language in another information source. Changes in either of these information sources may lead to inconsistencies.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Figure 1:
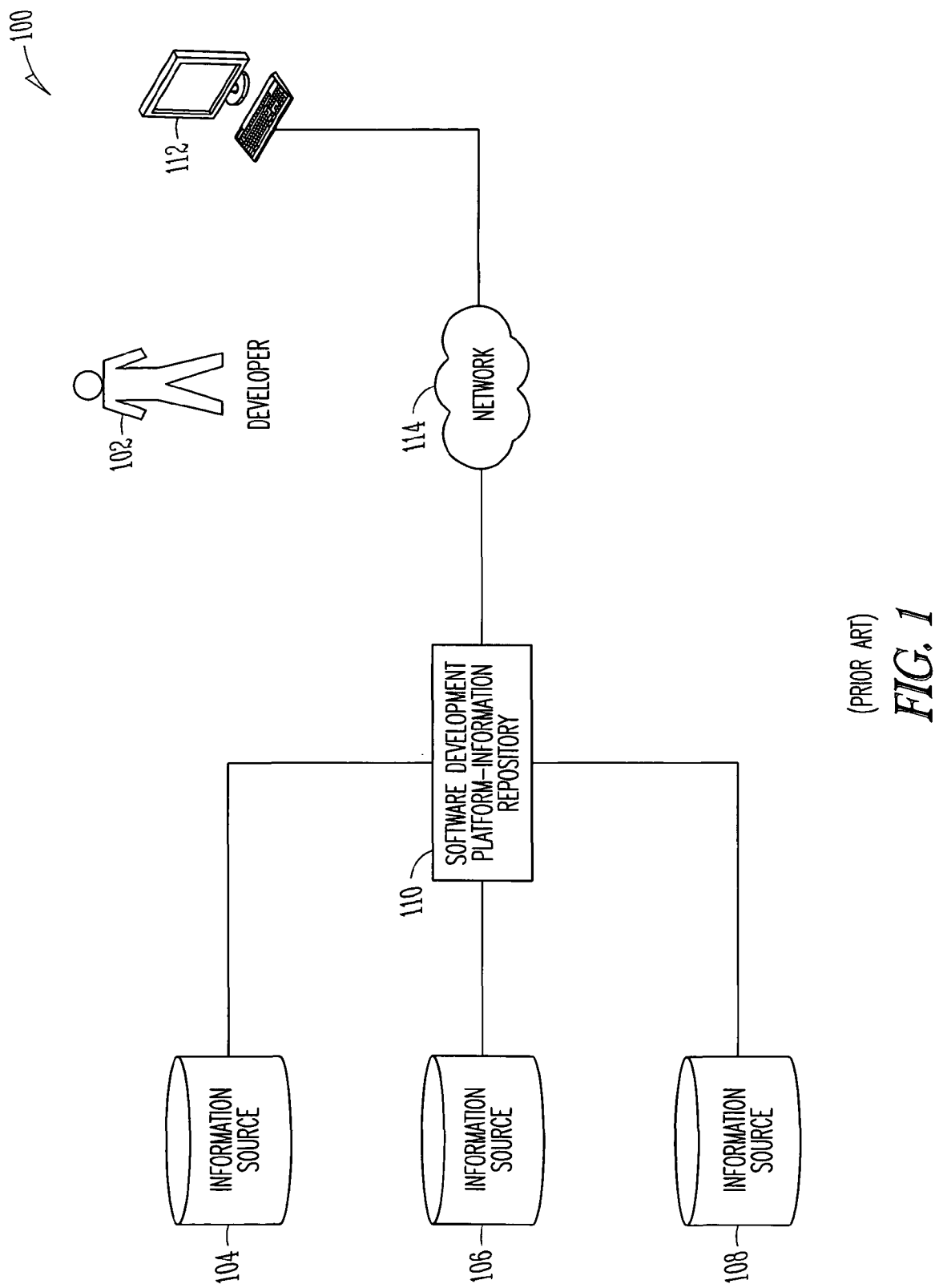
FIG. 1 is a block diagram showing an example prior art software development environment.
Figure 2:
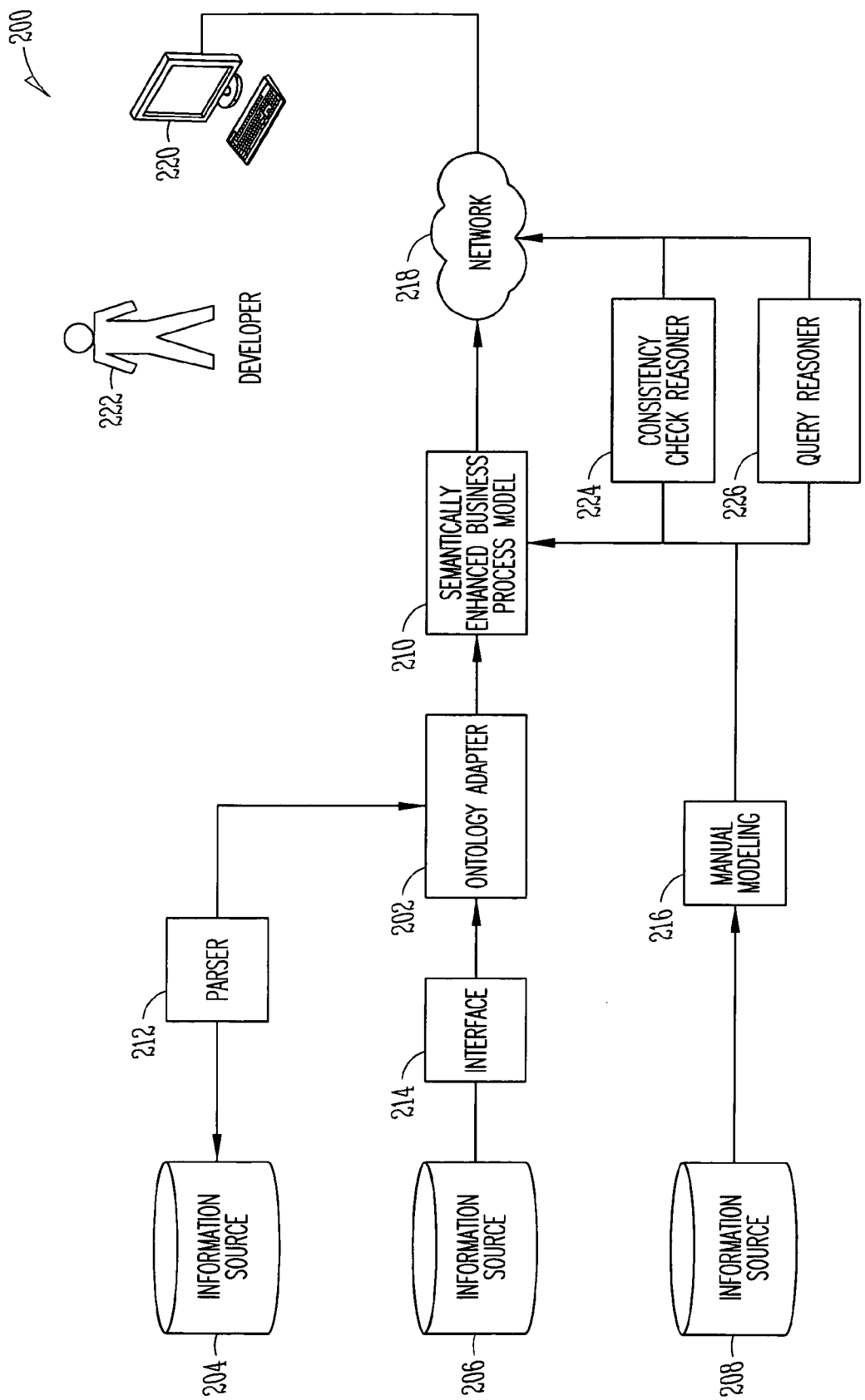
FIG. 2 is a block diagram illustrating an example software development environment and platform, according to an example embodiment.

FIG. 2 is a block diagram illustrating a software development environment or platform 200, according to an example embodiment. An ontology 202, in the example form semantically-enhanced business process model, is used to integrate a number of heterogeneous information sources 204, 206 and 208. The ontology 202, in the example embodiment, represents a complete conceptual model of the information sources 204-208, and may present a holistic and conceptual view of the relevant software development environment or platform 200. The ontology 202 may furthermore be defined to provide a logic-based representation formalism of each of the number of information sources 204-208, with the information sources 204-208 having heterogeneous representation formalisms.

In an example embodiment, the information sources 204-208 are transformed once to the ontology 202. For information sources expressed in formal languages (e.g., XML), such a transformation may be achieved automatically via mappings. For information sources not expressed in formal languages (e.g., expressed in natural language), a transformation may be manually performed. For example, natural language statements within a natural-language information resource may be manually represented via logical formulae. After the transformation of the various original information sources 204-208, in one example embodiment, only the ontology 202 is maintained, and derivative information sources are generated automatically from the ontology. In various example embodiments, the automatic generation of derivative information sources from the ontology may occur at design time, deployment time or run time.

In the example software development environment or platform 200 shown in FIG. 2, an ontology adapter 210 may be provided with XML data extracted by a parser 212 from a first information source 204. The ontology adapter 210 may further extract information from a second information source 206 via an interface module 214 that provides a programmatic interface to the ontology adapter 210. A third information source 208 may store information in a natural language format, which requires manual modeling 216 in order to transform the information source 208 to the ontology 202.

FIG. 2 also illustrates the ontology 202 that is accessible via a network 218 to the computer system 220 of a developer 222, and the integration of reasoning support into the development environment or platform 200 through the deployment of reasoners that are communicatively coupled to, or integrated with, the ontology 202. To this end, a consistency check reasoner 224 operates to perform consistency checks with respect to the ontology 202, while a query reasoner 226 processes queries against the ontology 202. Both the reasoners 224 and 226 are accessible, via the network 218, to a developer 222. The reasoners 224 and 226 may furthermore be used for additional tasks, such as for example automatic classification of data types While the semantically-enhanced business process model is described herein as being implemented as an ontology 202, it will be appreciated that other semantic data modelling techniques, such as taxonomies or hierarchies, may be used to facilitate representation of information within the information sources 204-208. For the purpose of present application, an ontology may be regarded as an explicit specification of a conceptualization (e.g., a shared conceptualization). Note that ontology-based applications, as described herein, may exploit conceptual modelling (conceptualization), reasoning (through explicit specification), or consensus (shared). Conceptualization may be regarded as the representation of a concept in a more or less formalized model, using cognitive modelling primitives. Modelling primitives may be cognitive when they resemble the way humans think and perceive the world. Ontologies usually provide classes, relations between classes, and instances as cognitive modelling primitives. Depending on the specified language used, classes may also be called concepts or universals, relations may also be called properties or rules, and instances may also be called individuals or particulars. The backbone of each conceptualization, and thus every ontology, is a hierarchy of classes commonly referred to as taxonomy. This means that sub and super class relations over prominent ontologies and special modelling primitives may be diverted to such hierarchies. Where an ontology is to provide an explicit specification of conceptualization, it is useful to differentiate explicit specification from implicit specification. Examples of implicit specification include graphical notations (e.g., event-driven process chains (EPC) or UML class diagrams), whose modelling constraints are described in natural language at best. This is in contrast to an "explicit specification," which seeks to avoid ambiguities bound to graphical notations by a specification including a formal, logic-based language. One benefit of the underlying logic is disambiguation and support of automatic reasoning on the basis of this conceptualization.

Reference is also made herein to "reasoning" supported by an ontology. In the context of an ontology, reasoning may be any logical deduction based on an explicit specification, which may be given by logical language. Reasoning may be provided on the basis of calculus, which defines a set of logical deduction rules. An implementation of a logical calculus may be called a "reasoner."

Further details regarding the operations performed with the various components illustrated in FIG. 2 will now be described with reference to a number of subsequent figures.

Figure 3:
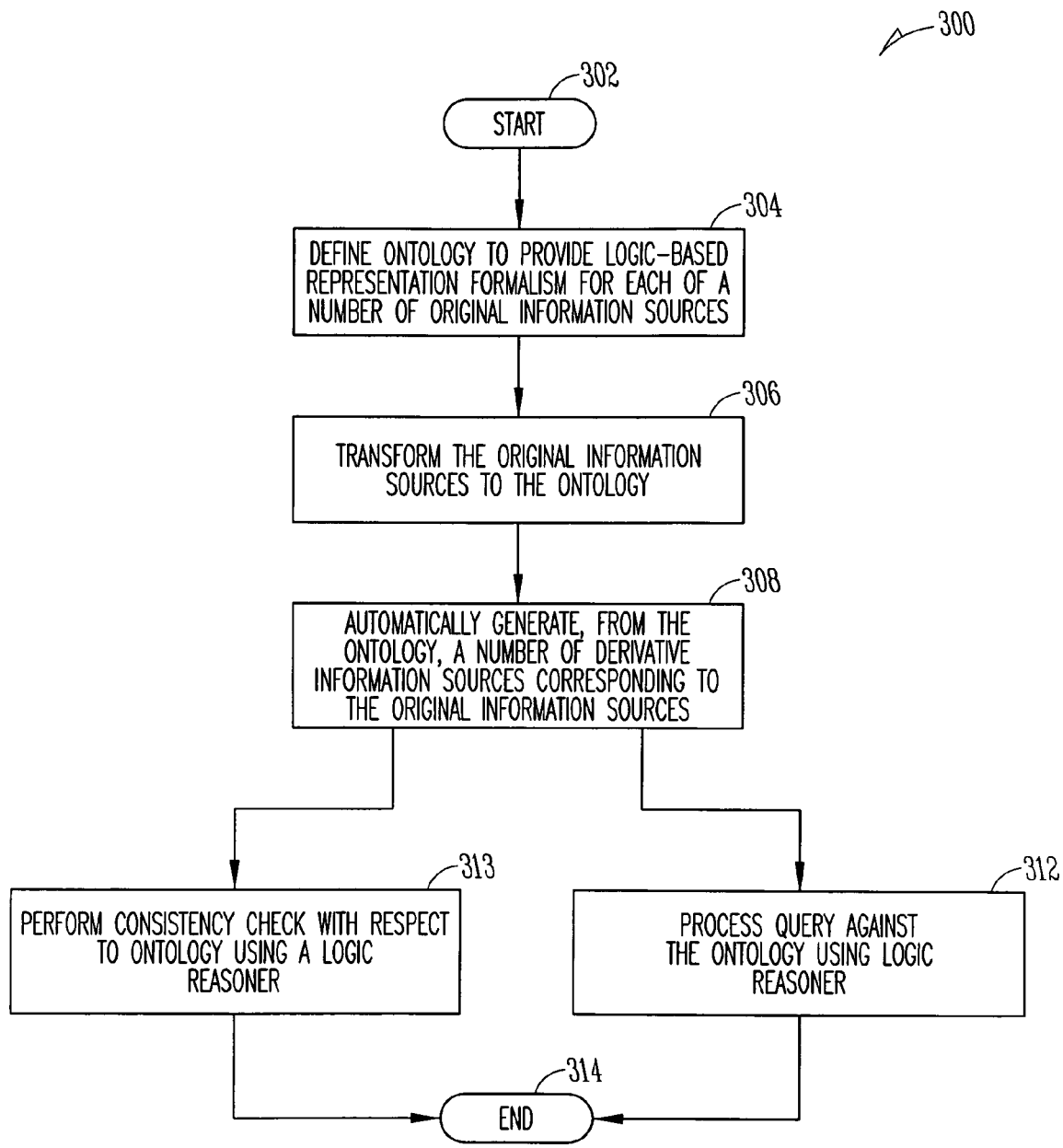
FIG. 3 is a flowchart illustrating a method, according to an example embodiment, to provide an ambiguous information integration, with reasoning support, in a software development environment or platform.

FIG. 3 is a flowchart illustrating a method 300, according to an example embodiment, to provide unambiguous information integration, with reasoning support, in a software development environment or platform, such as the environment or platform 200. The method 300 may be performed by any one of the modules, logic or components described herein and not necessarily by the exact components described with reference to FIG. 2. For example, various functions may be distributed across components of the computer systems that are communicatively coupled via network.

The method 300 starts at operation 302, and proceeds to operation 304, with the definition of the semantically-enhanced business process model, in the form of the ontology 202. As noted, the ontology 202 provides a logic-based representation formalism for each of a number of original information sources 204-208. It should however be noted that, for the purposes of the present specification, the term "ontology" shall be taken to refer to any common vocabulary for describing concepts that exist in an area of knowledge, and relationships that exist between such concepts.

At operation 306, the various original information sources 204-208 are transformed, adopted to, or lifted into the ontology 202. Further, details regarding the various operations of an example transformation are discussed below with reference to FIG. 4.

At operation 308, a number of generators (examples of which are discussed below with reference to subsequent figures) automatically generate, from the ontology 202, a number of derivative information sources corresponding to the original information sources. In one example embodiment, the automatic generation of a particular derivative information source may be performed on demand, and responsive to a request received within the context of the software development environment or platform 200. In other example embodiment, the automatic generation of one or more derivative information sources may be performed at design time, deployment time or at run time.

At operation 313, the consistency check reasoner 224 performs a consistency check with respect to the ontology 202. In one example embodiment, a description logic reasoner, such as KAON2, may be deployed to support consistency checks on the ontology 202. To this end, the ontology 202 may be fed into the consistency check reasoner 224, which in turn checks every concept definition for consistency. For example, contradictions in modeling may be detected and reported to a user (e.g., the developer 222). As an example, consider the following ontology:

ProjectManager=Researcher and Manager (e.g., for every possible individual X: if X is both a Researcher and a Manager, it is called a ProjectManager)

Researcher is disjoined from Manager (e.g., for every possible individual X: if X is a Researcher, it must not be a Manager)

Both definitions above are inconsistent. Specifically, there cannot exist an X that is a ProjectManager because of the disjointedness between Research and Manager. The consistency check reasoner 224 may be applied to detect whether, for example, a business object that is used in two process components would be an invalid situation within a particular business process platform. Many other inconsistencies may similarly be detected.

At operation 312, the query reasoner 226 may be deployed to process a query received against the ontology 202. Querying (e.g., instance retrieval from the ontology 202) may be regarded as a special case of reasoning. The ontology 202 enables the number of information sources 204-208 to be queried as an integrated model from arbitrary aspects. For example, consider that the developer 222 may want to query the integrated representation of the information sources 204-208 for debugging purposes. Consider an example in which an error is occurring when particular process agent of a business process platform (e.g., MaintainEmployeeTimeConfirmationPurchaseOrderInboundProcessAgent) calls a particular business object (e.g., a EmployeeTimeConfirmationViewOnPurchaseOrder business object). The error could originate in other business process components that indirectly call the TimeAndLaborManagement process component.

The ontology 202 enables a developer 222, via the query reasoner 226, to query every process agent, message, service operation and interface that is participating in an invocation chain to the TimeAndLaborManagement process component. In order to enable this, the ontology 202, in an example embodiment, models an invocation chain (e.g., represented by arrows in FIG. 5) as an ontological relation between process agents, messages, service operations and interfaces. In addition, the ontology 202 may define the invocation relation as being transitive, e.g.:

invokes(x,z)←invokes (x,y) and invokes(y,z)

When querying the query reasoner 226 for all x in:

invokes(x, EmployeeTimeConfirmationViewOnPurchaseOrder)

the query reasoner 226 returns all x that participate in the invocation chain considering the transitive closure (note, that ServiceOperations and—Interfaces are also interlinked via relations). Consider the following example invocation chain, which is illustrated and described in further detailed below with reference to FIG. 5:

MaintainEmployeeTimeConfirmationPurchaseOrder (520): OutboundProcessAgents
PurchasingIn (516):ServiceInterface
MaintainEmployeeTimeConfirmationViewOnPurchaseOrder (518):ServiceOperation
PurchaseOrderNotification (514):Message
PurchasingOut (513):ServiceInterface
NotifyOfPurchaseOrder (512):ServiceOperation
NotifyOfpurchaseOrderToTimeAndLaborManagement (508):InboundProcessAgents
PurchaseOrder (506):BusinessObject
PurchaseOrderProcessing:ProcessComponent The method 300 then terminates at operation 314.

Figure 4:
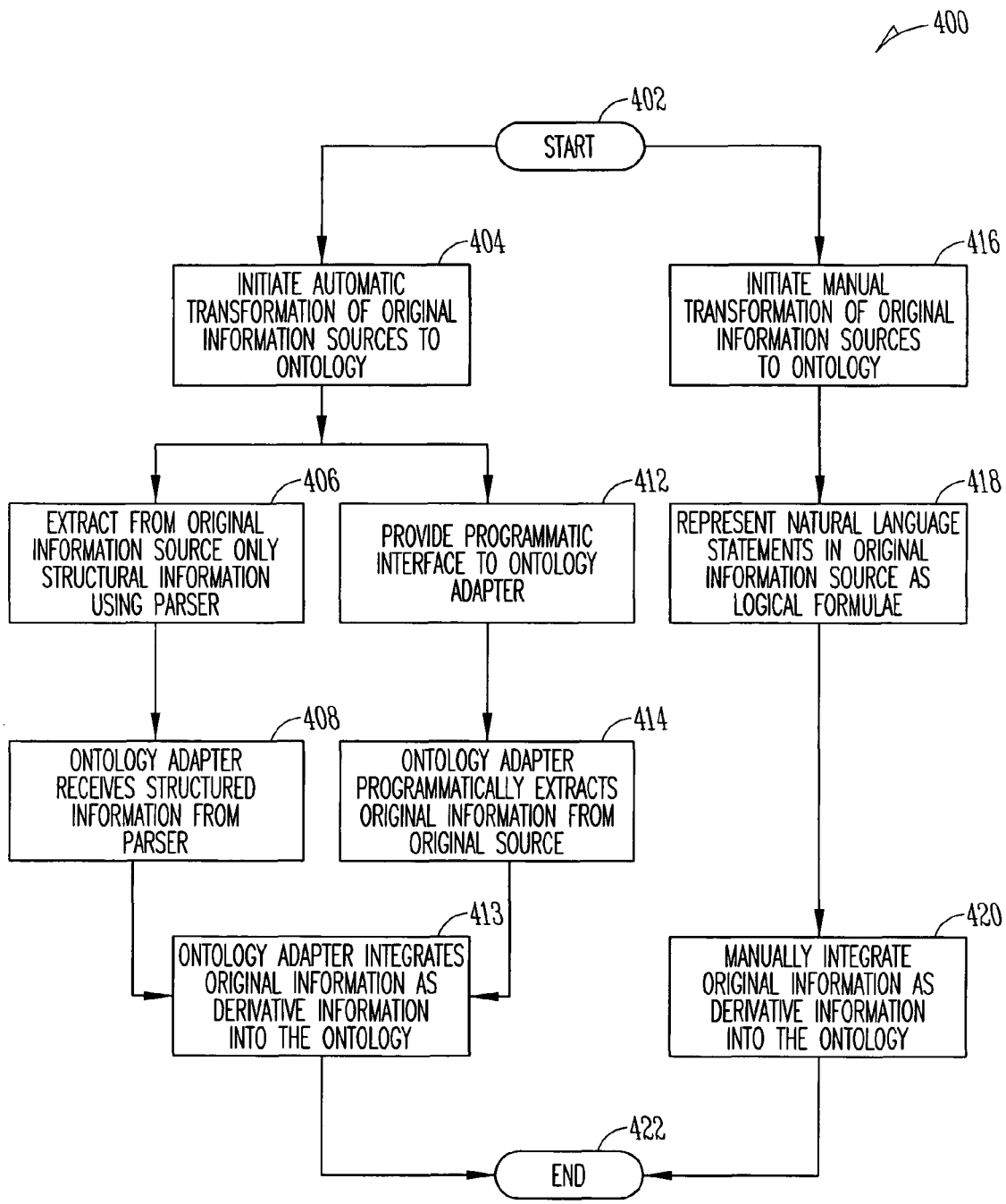
FIG. 4 is a flowchart illustrating a method, according to an example embodiment, to transform a number of original information sources to an ontology.

FIG. 4 is a flowchart illustrating a method 400, according to an example embodiment, to transform a number of original information sources (e.g., the information sources 204-208) to an ontology (e.g., the ontology 202). The described operations of the method 400 may be performed as part of the operation 306 described above with reference to FIG. 3.

Figure 5:
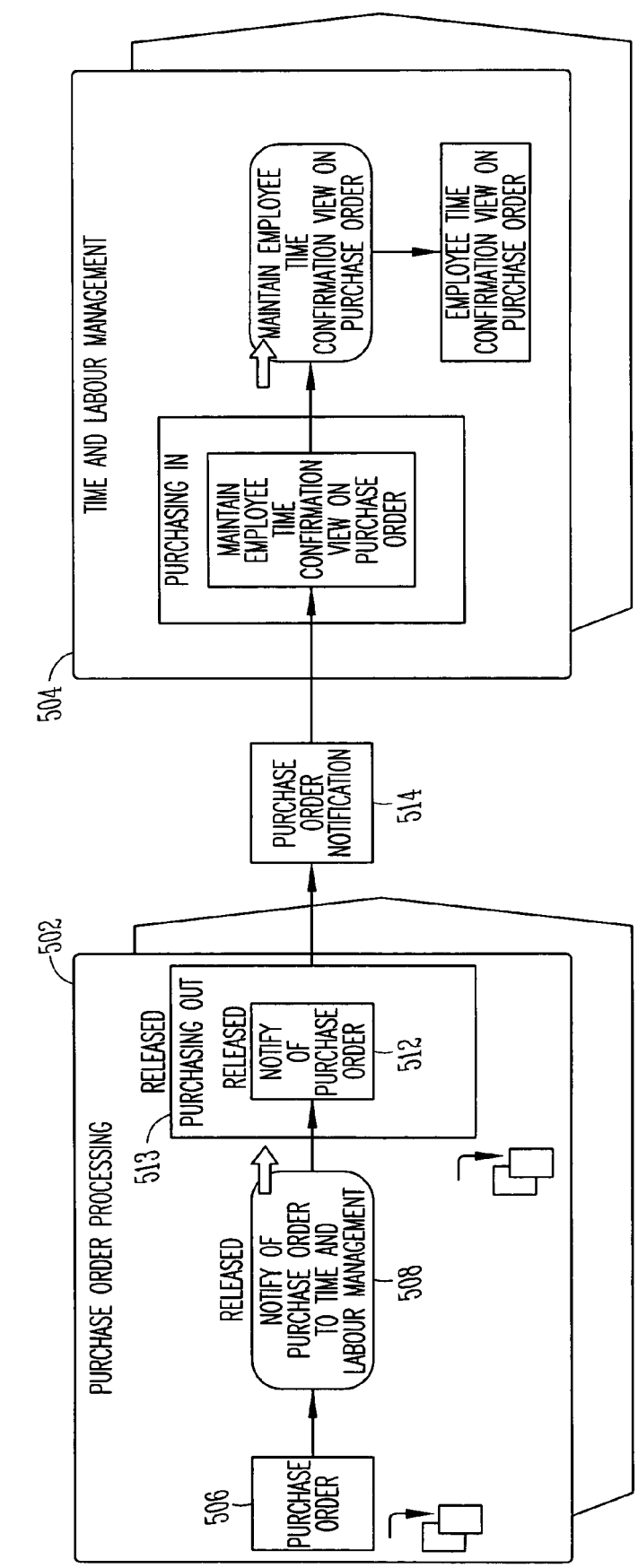
FIG. 5 illustrates an ARIS model defining interactions between a PurchaseOrderProcessing component and a TimeAndLaborManagement component of a business process system.

The method 400 commences at operation 402 and, at operation 404, an automatic transformation of the original information sources 204 and 206 to the ontology 202 may be initiated. The information sources 204 and 206 may be selected for automatic transformation as a result of these information sources being expressed in formal languages (e.g., XML) or as a result of having a formally defined interface. Dealing first with the original information source 204, the parser 212 may, at operation 406, extract original information from the original information source 204 as structural information only. In one example embodiment, the original information source 204 may conform to the Architecture of Integrated Information Systems (ARIS), and the parser 212 accordingly exports proprietary-represented information in an XML file. To this end, FIG. 5 illustrates an example ARIS model 500 definition of interactions between a PurchaseOrderProcessing component 502 and a TimeAndLaborManagement component 504 of a business process system forming part of the platform 200. Each of the components 502 and 504 contains a number of business objects (e.g., a PurchaseOrder object 506), outbound process agents (e.g., a NotifyofPurchaseOrderToTimeandLaborManagement process agent 508, service interfaces (e.g., a PurchasingOut interface 513 and service operations (e.g. a NotifyOfPurchaseOrder service operation 512)). Further, the components 502 and 504 are linked via a message (e.g., a PurchaseOrderNotification message 514).

One technical challenge that is presented by an XML export of a process component interaction model, such as that shown in FIG. 5, is the comingling of structural information (e.g., which business object is used within which process component) with graphical information (e.g., layout, positioning and colors).

The following XML snippet shows part of an example integration scenario export. Specifically, the XML snippet represents a PurchaseOrderProcessing process component via an <ObjDef> tag. Many attributes of a diverse nature are given via a <AttrDef> tag, attributes are. For example, one contains the name of a process component, while others contain a timestamp and a user of the last changes and other graphical information.

```
<ObjDef ObjDef.ID="ObjDef.3ps---30----p--2---"
  TypeNum="OT__SAP__NETWEAV__PROCESS__A2A"
  ToCxnDefs.IdRefs="CxnDef.8r1---30----q--2--- "
  SymbolNum="ST__SAP__NETWEAV__PROCESS__A2A__1">
  <GUID>d939c1bb-614b-4727-a3d1-c15473313bdd</GUID>
  <AttrDef AttrDef.Type="AT__UA__TXT__109">
    <AttrValue LocaleId="&LocaleId.USen;">Peter Neumayer</AttrValue>
  </AttrDef>
  <AttrDef AttrDef.Type="AT__UA__TXT__105">
    <AttrValue LocaleId="&LocaleId.USen;">Suzanne Geall</AttrValue>
  </AttrDef>
  <AttrDef AttrDef.Type="AT__UA__VAL__61">
    <AttrValue LocaleId="&LocaleId.USen;">AVT__VALUE__655-
    </AttrValue>
  </AttrDef>
  <AttrDef AttrDef.Type="AT__UA__TXT__197">
    <AttrValue LocaleId="&LocaleId.USen;">
    PurchaseOrderProcessing</AttrValue>
  </AttrDef>
  ...
</ObjDef>
...
```

In the example embodiment, the ARIS parser 212 analyzes an XML export, such as that shown above, and extracts only a structure of information (e.g., process components, business objects, agents and service interfaces). Interlinkages between components (e.g., represented by the arrows in FIG. 5), are also extracted.

Returning to FIG. 4, at operation 408, the ontology adapter 210 receives the structural information from the parser 212, and at operation 413, the ontology adapter 210 integrates the structured information as a derivative information into the ontology 202 (e.g., as a semantically-enhanced business process model).

Figure 6:
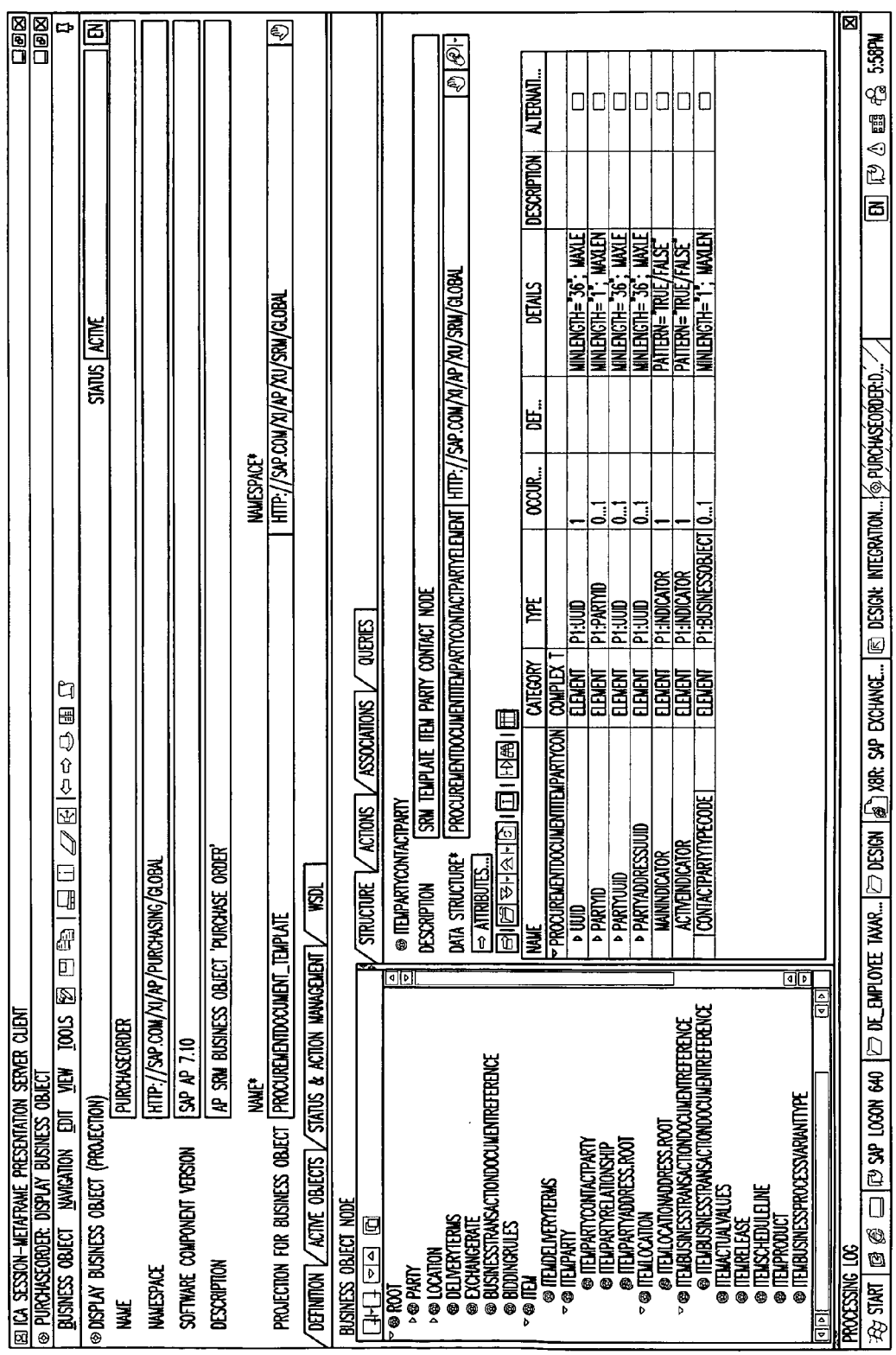
FIG. 6 is a screenshot reflecting a hierarchical structure of an example PurchaseOrder business object as may be maintained in an example embodiment.

Turning now to a further original information source 206, this information source 206 may provide WebServiceInterfaces (e.g., described by the Web Services Description Language (WSDL) files), as well as various structured data (e.g., business objects and messages). In one example embodiment, the information source 206 may be a SAP Enterprise Service Repository (ESR), and may conform to the structure of SAP's Global Data Types (GDTs), as well as the structure of SAP business objects and messages (e.g., a PurchaseOrder). In this example, the interface module 214 may be an ESR interface which, at operation 412, provides a programmatic interface for the information source 206 to the ontology adapter 210. In the example embodiment, the ontology adapter 210 may use a programmatic Java interface of the ESR repository to extract structural information from the information source 206. FIG. 6 is a screenshot reflecting a hierarchical structure of a PurchaseOrder business object that may be maintained in an example embodiment in which the information source 206 is the SAP ESR. Accordingly, at operation 414, the ontology adapter 210 may programmatically extract structural data from the ESR utilizing the interface module 214, such structural data including, for example hierarchical structure as reflected in the screenshot 600 of FIG. 6.

The following code snippet provides an example of a fetchFromXI( ) Java method that iteratively extracts data types, business object structures and service interfaces. The ontology adapter 210 may add such information to semantically-enhanced business process model (e.g., the ontology 202), at operation 413.

```
private void fetchFromXI(String nSpace, String destinationUrl,
        String objectType) {
    progressListener.receiveProgress(0);
    String[ ] args = new String[ ] {gui.getXIPropertiesFilename( ),
        destinationUrl };
    Properties props = new Properties( );
    System.setProperty("javax.xml.transform.TransformerFactory",
        "net.sf.saxon.TransformerFactoryImpl");
    String outdir = ".";
    if (args.length < 1) {
        System.err.println("Usage: "
            + XIExport2WSDLFileGrabber.class.getName( )
            + " <property-file> [out-dir]");
        throw new IllegalArgumentException( );
    }
    try {
        if (args.length > 1) {
            outdir = args[1];
        } else {
            outdir = ".\\";
        }
    }
    props.load(new FileInputStream(args[0]));
    props.setProperty("namespace", nSpace);
    String namespace = props.getProperty("namespace",
        nSpace);
    String namematch = props.getProperty("namematch","*");
    ILogonData logonData =
        ESRFacadeFactory.createNewLogonData(props);
    IESRXIFacade esrFacade = ESRFacadeFactory
        .createESRFacade(logonData);
    ComplexAttributeCondition nameNamespaceComplexCond =
        new ComplexAttributeCondition( );
    SingleAttributeCondition nameCond = new
        SingleAttributeCondition( );
    nameCond.setKey(RepObjectKey.NAME);
    nameCond.setOperator(SingleAttributeCondition.LIKE);
    nameCond.setValue(namematch);
    ...
```

-continued

```
    BusinessObject[ ] businessObjects = null;
    DataType[ ] dataTypes = null;
    ServiceInterface[ ] serviceInterfaces = null;
    /*
    * Export Data Types
    */
    If (objectType.equals(IRepositoryQueryFacade.DATA_TYPE)) {
        esrFacade.addSelectedType(IRepositoryQueryFacade.-
            DATA_TYPE);
        dataTypes = esrFacade.getRepositoryQueryTree( ).getDataTypes(
            namespace);
        WsdlGenerationControl7_0 wsdlgc = new
            WsdlGenerationControl7_0( );
        wsdlgc.setDocuLanguage(Language.DE);
        for (int i = 0; i < dataTypes.length; i++) {
            progressListener.receiveProgress((double) i
                / dataTypes.length);
            File of = new
                File(outdir,dataTypes[i].getKey( ).getName( )+ ".wsdl");
            FileOutputStream fos = new FileOutputStream(of,false);
            PrintWriter pw = new PrintWriter(fos);
            String wsdl = new String(dataTypes[i].getWsdl(wsdlgc)
                .getBytes( ), "UTF-8");
            pw.write(wsdl);
            pw.close( );
            fos.close( );
        }
    }
    /*
    * Export Business Objects
    */
    if (objectType.equals(IRepositoryQueryFacade.-
        BUSINESS_OBJECT)) {
        esrFacade
        .addSelectedType(IRepositoryQueryFacade.BUSINESS_OBJECT);
        businessObjects = esrFacade.getRepositoryQueryTree( )
            .getBusinessObjects(namespace);
        WsdlGenerationControl7_0 wsdlgc = new
            WsdlGenerationControl7_0( );
            wsdlgc.setDocuLanguage(Language.DE);
        for (int i = 0; i < businessObjects.length; i++) {
            progressListener.receiveProgress((double) i
                / dataTypes.length);
            File of = new File(outdir, businessObjects[i].getKey( )
                .getName( )
                + ".wsdl");
            FileOutputStream fos = new FileOutputStream(of, lse);
            PrintWriter pw = new PrintWriter(fos);
            String wsdl = new
                String(businessObjects[i].getWsdl(wsdlgc)
                .getBytes( ), "UTF-8");
            pw.write(wsdl);
            pw.close( );
            fos.close( );
        }
    }
    /*
    * Export Service Interfaces
    */
    if (objectType.equals(IRepositoryQueryFacade.-
        SERVICE_INTERFACE)) {
        esrFacade
        .addSelectedType(IRepositoryQueryFacade.SERVICE_INTERFACE);
        serviceInterfaces =
        esrFacade.getRepositoryQueryTree( )
        .getServiceInterfaces(namespace);
        WsdlGenerationControl7_0 wsdlgc =
        new WsdlGenerationControl7_0( );
            wsdlgc.setDocuLanguage(Language.DE);
        for (int i = 0; i < serviceInterfaces.length; i++) {
            progressListener.receiveProgress((double) i
                / dataTypes.length);
            File of = new File(outdir,
                serviceInterfaces[i].getKey( ).getName( )+ ".wsdl");
            FileOutputStream fos = new FileOutputStream(of,false);
            PrintWriter pw = new PrintWriter(fos);
            String wsdl = new String(serviceInterfaces[i].getWsdl(
                wsdlgc).getBytes( ), "UTF-8");
            pw.write(wsdl);
```

```
        pw.close( );
        fos.close( );
      }
    }
  } catch (Exception e) {
    e.printStackTrace( );
  }
}
```

Moving on now to the consideration of an example embodiment in which the information source 208 is described in natural language, it will be appreciated that natural language constraints (e.g., natural language business constraints) may not be reflected in the interface module 214 or the parser 212. As an example, consider some constraints that may be provided in a Word document for a PurchaseOrder business object:

PurchaseOrder can only have one BuyerParty.
  PurchaseOrder can only have one SellerParty.
  BusinessTransactionDocumentID should be unique.
  BusinessTransactionDocumentProcessingTypeCode to have the value of (ECPO).
  TotalNetAmount field at a root node is the sum of NetAmountsatPurchaseOrderItems node.

Such constraints given in natural language may be required to be integrated into the ontology 202 by manual modeling 216. Accordingly, at operation 416 of the method 400 shown in FIG. 4, manual transformation of an original information source (e.g., information source 208) may be initiated. For example, an ontology engineer may interpret the natural language business constraints expressed in the information source 208 and model them in a target ontology language (e.g., by representing natural language statements in the original information source 208 as logical formulae at operation 418). Note that some constraints may not be representable in the ontology, depending on ontology language used. Here, the ontology developer may be required to elevate natural language constraints to a more formal level.

At operation 420, the modelled constraints of the original information source 208 are integrated into the ontology as derivative information. The method 400 then terminates at 422.

Figure 7:
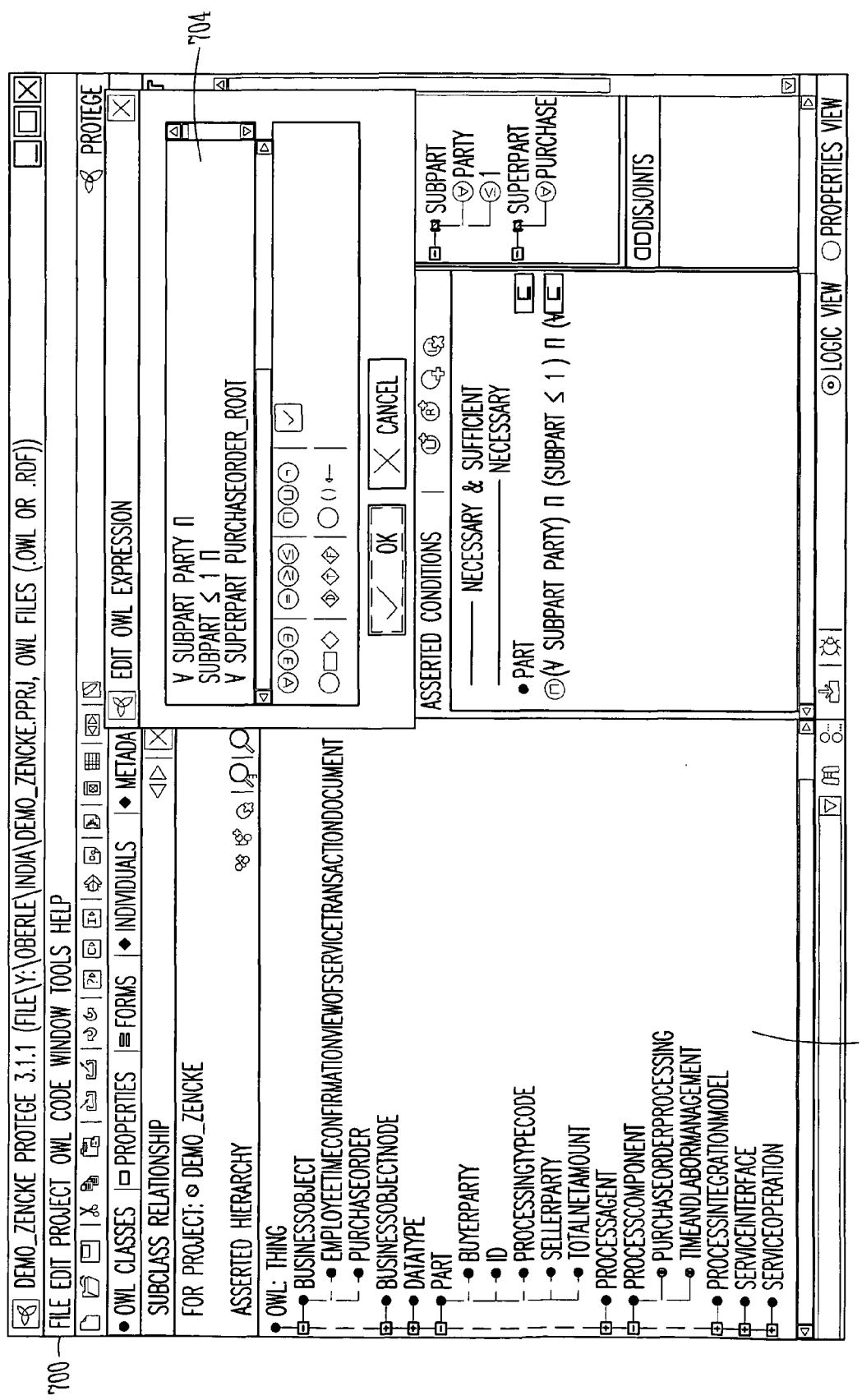
FIG. 7 is a screenshot illustrating a user interface depicting a semantically-enhanced business process model, according to an example embodiment.

FIG. 7 is a screenshot illustrating a user interface 700 depicting a semantically-enhanced business process model (e.g., an ontology, according to an example embodiment.) The example business process model is expressed using the Web Ontology Language Description Logic (OWL-DL) ontology language, and edited and managed using the Protégé ontology editor. Note that other ontology language options could equally be used. Typically, trade-offs exist between the expressiveness of an ontology language and the efficiency of reasoning provided thereby. OWL-DL, is description logic which provides reasoning support (e.g., consistency checks as discussed above).

A first window display area 702 of user interface 700 illustrates a backbone of the example ontology. Shown are concepts for BusinessObjects, DataTypes, ProcessComponents, ProcessAgents, ServiceInterface, and also the various structural components discussed elsewhere in this document by way of example. All the information extracted from the various heterogeneous information sources 204-208 may be integrated into this ontology (e.g., the ontology 202) in an ambiguous manner, as a result of the ontology language's underlying logical formulism. A popup window 704 also shown in FIG. 7 represents a manually modelled constraint of "PurchaseOrder can have only one SellerParty."

In one example embodiment, the transformation of the number of information sources 204-208 to the ontology may be "read-only" transformation, in that the original information sources 204-208 are maintained. Other approaches may include maintaining the information within the ontology with back-propagation to the original information sources 204-208. A further approach may include, subsequent to transformation of the original information sources 204-208, maintaining only the ontology 202, and automatically generating derivative information sources automatically from the ontology. This generation of the derivative information sources may occur at design time, deployment time or run time, depending on various use cases and requirements.

An example embodiment is discussed below wherein derivative information sources are generated from the ontology 202, responsive to requests or queries against the ontology 202. In this example, the information extracted from the original information sources 204-208 is maintained within the ontology, and the original information sources may be discarded, or, alternatively, may be supported with back-propagation from the ontology 202.

Figure 8:
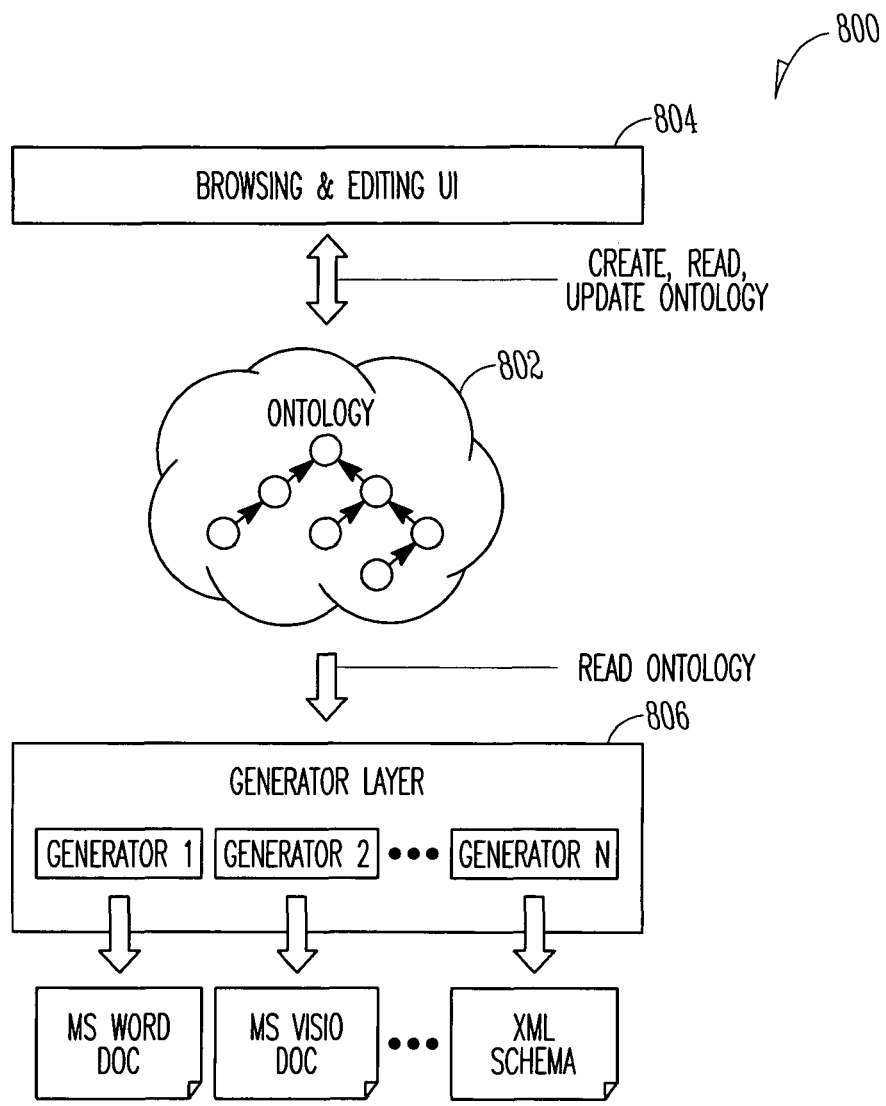
FIG. 8 is a diagrammatic representation of a system, according to an example embodiment, to provide ontology-based generation of information sources within the context of a software development platform.

FIG. 8 is a diagrammatic representation of a system 800, according to an example embodiment, to provide ontology-based generation of derivative information sources within the context of a software development platform. The system 800 includes an ontology 802 (e.g., corresponding to the ontology 202 shown in FIG. 2). A user (e.g., developer) can create, read and update the ontology 802 via an appropriate user interface (UI 804).

Figure 9:
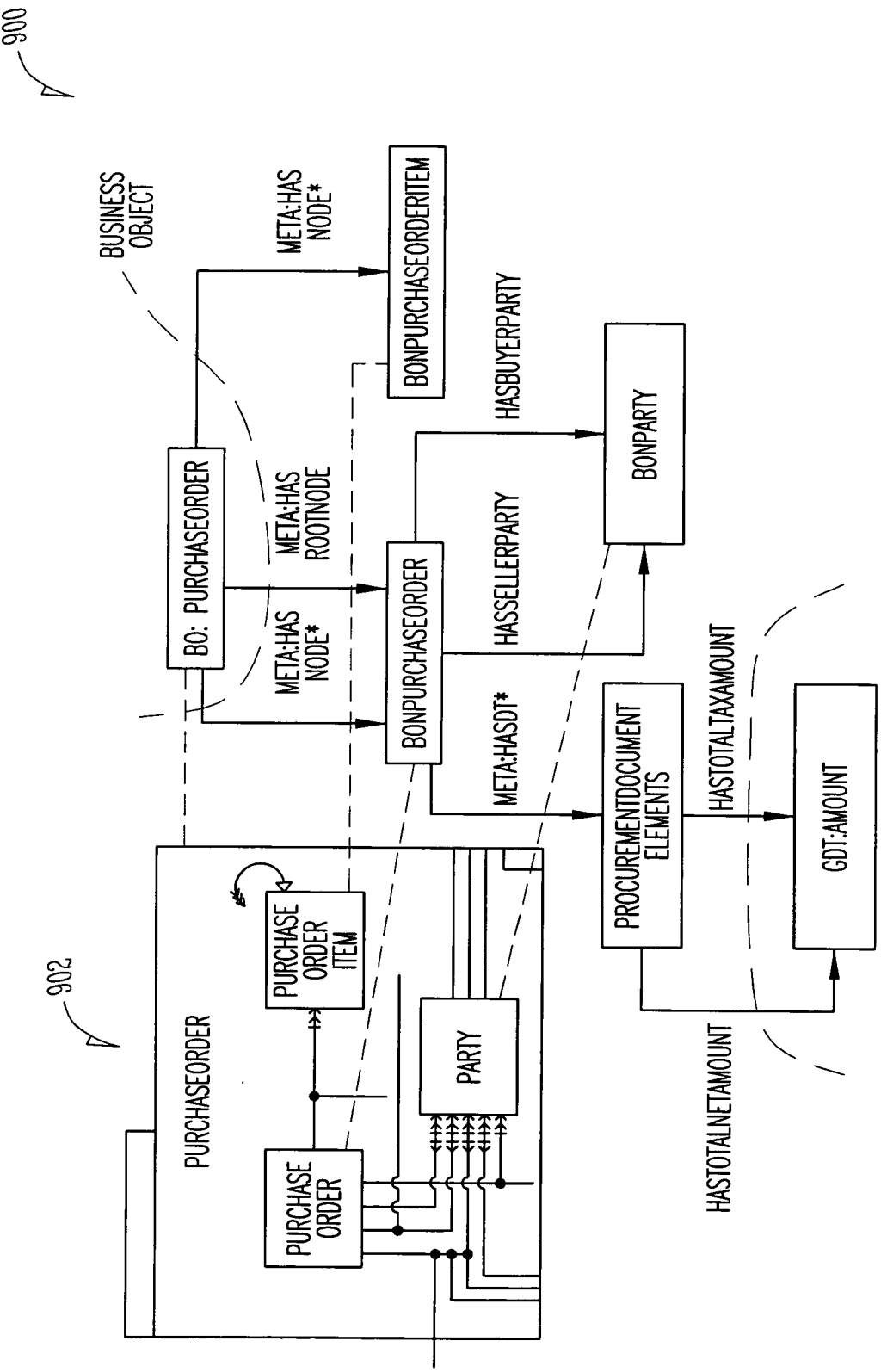
FIG. 9 shows a snippet of an example ontology formalizing a "PurchaseOrder" business object structure.

Further, a generator layer 806 includes a number of generators that, using the ontology 802 as a central source, are able to automatically generate a number of derivative information sources (e.g., corresponding to the original information sources 204-208 or conforming to a required format). To this end, respective generators of generator layer 806 are shown in FIG. 8 to output derivative information sources as Microsoft Word documents, Microsoft Visio documents and XML schemas, respectively. Examples of various generators that may be included within the generator layer 806 are described in further detail below. Prior to that discussion, reference is made to FIG. 9, which shows a snippet 900 of an example ontology formalizing a "PurchaseOrder" business object structure. Corresponding original information source is shown at 902. As described above, before the generation of derivative information sources from an ontology can be derived, a corresponding original information is transformed into the ontology, at least once. This transformation may be performed, as described above, with a number of information sources, leading to a comprehensive, conceptual and integrated view of a number of original information sources, represented in a logical-based ontology language.

Figure 10:
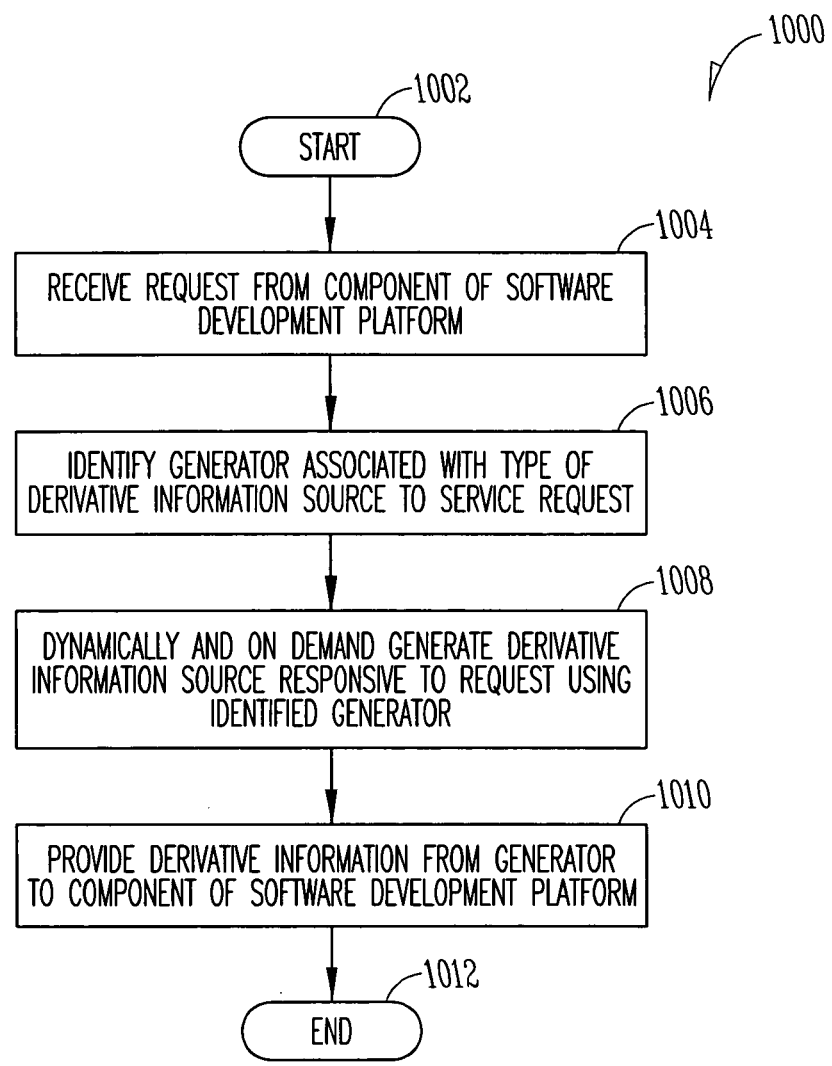
FIG. 10 is a flowchart illustrating a method, according to an example embodiment, to automatically generate, from an ontology, a number of derivative information sources.

FIG. 10 is a flowchart illustrating a method 1000, according to an example embodiment, to automatically generate, from an ontology, a number of derivative information sources. In one example embodiment, the operations for the method 1000 may be performed as part of the operation 308 shown in FIG. 3.

The method 1000 commences at operation 1002, and proceeds to 1004, where a request is received at the generator layer 806 for specific information pertaining to a software development platform. While the method 1000 is described as automatically and dynamically generating a derivative information source responsive to a request received at run time, it would really be appreciated that derivative information sources may be generated at design time, deployment time, or run time in the various user scenarios.

At operation 1006, a generator associated with a particular type of derivative information source may be identified. For example, where the request is for information in a particular format (e.g., MS Word, MS Video or XML) an appropriate generator within the generator layer 806 dedicated to the generation of the particular type of information may be identified.

To this end, a request received at operation 1004 may be parsed to identify an information type identified in the request, and the information type may be matched to a generator utilizing a metadata pertaining to the generators of the generator layer 806.

At operation 1008, the identified generator, appropriate to the type of information requested, dynamically and on demand, generates a derivative information source responsive to the request. At operation 1010, the relevant generator then provides derivative information to the component of the software development platform from which the request originated, whereafter the method 1000 terminates at operation 1012.

Figure 11:
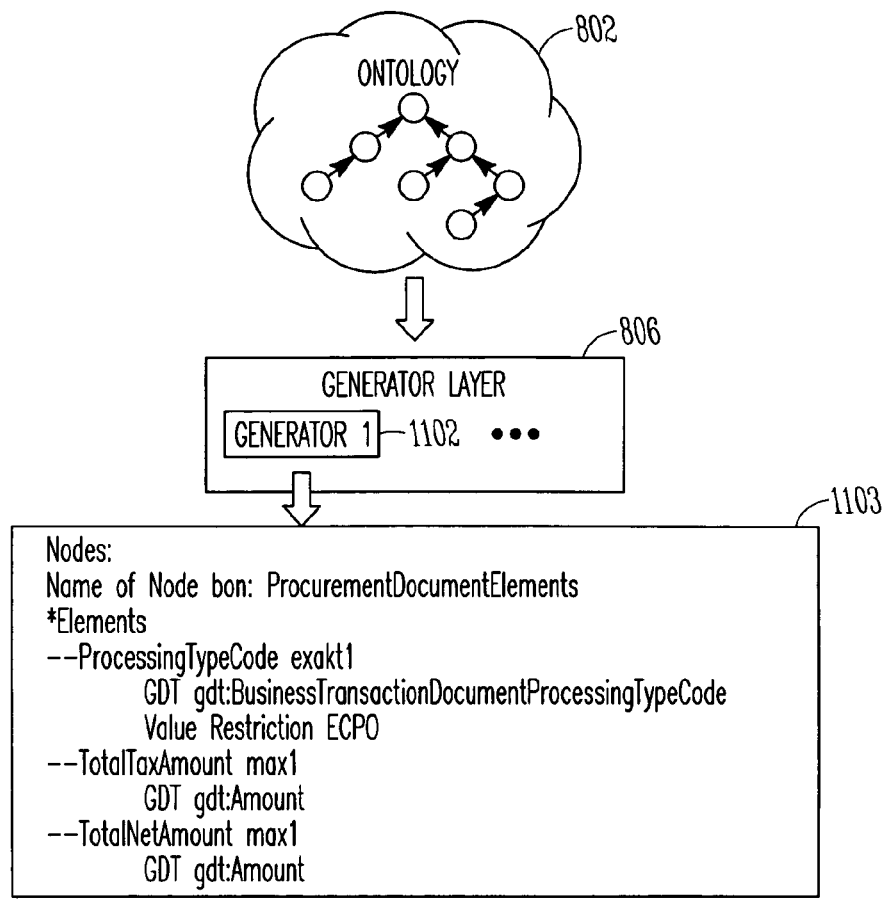
FIG. 11 illustrates a first type of generator that, in the example embodiment, may be deployed to create natural language text out of an ontology.

Described below are examples of various generators which may be included within the generator layer 806. FIG. 11 illustrates a first generator 1102 that, in the example embodiment, may be deployed to create natural language text out of the ontology 802. Two examples are described below. For the purposes of these examples, whether a natural language text is represented in Microsoft Word format, ASCII format, etc., is not material.

Operationally, the first generator 1102 receives, as input, the ontology 802 and an identifier of a class to be translated into natural language text.

At a next operation, the first generator 1102 reads the class identified by the identifier, as well as the properties, constraints and restrictions of the class. This information is then translated by the first generator 1102 into natural language.

The translation of the properties, constraints and restrictions to natural language includes assembling the properties, constraints and restrictions by logical operators (e.g., logical AND, OR, NOT etc.). Each of the logical operators is affiliated with a text snippet (e.g. "and", "or", "is not", etc.) A logical formula is then translated by concatenation of the parts of the formula. As an example, consider the formula shown in the popup window 704 of FIG. 7. This formula would be translated into "all subparts of SellerParty are of type Party and there is a maximum of one Party."

Having performed a translation, the first generator 1102 then outputs a text file (e.g., in Microsoft Word, ASCII or some other text format). Shown at 1104 is a snippet of an original Word document (e.g., contained in an original information source) that was transformed into the ontology and used to generate the outputted text file 1103.

Example source code for the first generator 1102 is as follows:

```
Source Code of Generator 1
import java.util.HashMap;
import java.util.Set;
import de.fzi.saplanguage.content.*;
import org.semanticweb.kaon2.api.Axiom;
import org.semanticweb.kaon2.api.DefaultOntologyResolver;
import org.semanticweb.kaon2.api.KAON2Connection;
import org.semanticweb.kaon2.api.KAON2Manager;
import org.semanticweb.kaon2.api.Ontology;
import org.semanticweb.kaon2.api.Request;
import java.util.*;
public class OWLTranslation {
    public static void main(String[ ] args) throws Exception {
        // OWLHandler init:
        OWLHandler owlhandler=new OWLHandler( );
      KAON2Connection connection=KAON2Manager.newConnection( );
          DefaultOntologyResolver resolver=new DefaultOntologyResolver( );
        resolver.registerReplacement
("http://www.fzi.de/downloads/ipe/SAP_BO/BONs.owl","file:BONs.owl");
resolver.registerReplacement("http://www.fzi.de/downloads/ipe/SAP_BO/BOs.owl","file:
BOs.owl");
resolver.registerReplacement("http://www.fzi.de/downloads/ipe/SAP_BO/AlignedBOs.owl
","file:AlignedBOs.owl");
resolver.registerReplacement("http://www.fzi.de/downloads/ipe/SAP_BO/GDTs.owl","file:
GDTs.owl");
resolver.registerReplacement("http://www.fzi.de/downloads/ipe/SAP_BO/meta.owl","file:
meta.owl");
      connection.setOntologyResolver(resolver);
      Ontology
ontology=connection.openOntology("http://www.fzi.de/downloads/ipe/SAP_BO/BONs.
owl",new HashMap<String,Object>( ));
      // alle Axiome lesen und Modell aufbauen
      Request<Axiom> axiomRequest=ontology.createAxiomRequest( );
      Set<Axiom> axioms=axiomRequest.get( );
      for (Axiom axiom : axioms)
      {
        //System.out.println("a: " +axiom.toString( ));
        owlhandler.addAxiom(axiom.toString( ));
      }
      System.out.println( );
ontology=connection.openOntology("http://www.fzi.de/downloads/ipe/SAP_BO/Aligned
BOs.owl",new HashMap<String,Object>( ));
      // alle Axiome lesen und Modell aufbauen
      axiomRequest=ontology.createAxiomRequest( );
      axioms=axiomRequest.get( );
      for (Axiom axiom : axioms)
      {
```

```
            //System.out.println("a: " +axiom.toString( ));
            owlhandler.addAxiom(axiom.toString( ));
        }
        System.out.println( );
ontology=connection.openOntology("http://www.fzi.de/downloads/ipe/SAP_BO/meta.owl",new
HashMap<String,Object>( ));
        // alle Axiome lesen und Modell aufbauen
        axiomRequest=ontology.createAxiomRequest( );
        axioms=axiomRequest.get( );
        for (Axiom axiom : axioms)
        {
            //System.out.println("a: " +axiom.toString( ));
            owlhandler.addAxiom(axiom.toString( ));
        }
        System.out.println( );
        // SAP-speziell: finde BO
            // String
a=owlhandler.listOWLClasses("http://www.fzi.de/sapowll#BusinessObject");
        String
a=owlhandler.listOWLClassesSequentiell("http://www.fzi.de/downloads/ipe/SAP_BO/meta.-
owl#BusinessObject");
        Vector structure=new Vector( );
        structure.add("s");
        //int level=1;
        //owlhandler.navigateRecursiv(a, structure,level);
        /*
        while (!a.equals("") && structure.size( ) > 0)
        {
            //System.out.println("you choose " +a);
            System.out.println("Structure of " +a);
            structure=owlhandler.parseConstraintsToGetStructure(a);
            if (structure.size( ) > 0)
            {
                System.out.println("Navigate:");
                for (int x=0;x<structure.size( );x++)
                {
                    SAPStructureElement
sa=(SAPStructureElement)structure.elementAt(x);
                    System.out.println("("+x+") : " +sa.getClassName( ) + " -- Type: "
+sa.getStructureType( ) + " constraint: " +sa.getConstraintType( ) + " composition: "
+sa.getCompositionType( ) );
                }
            }
            a=owlhandler.getRequestedNavigationElement(structure);
        }
        */
    }
}
```

Figure 12:
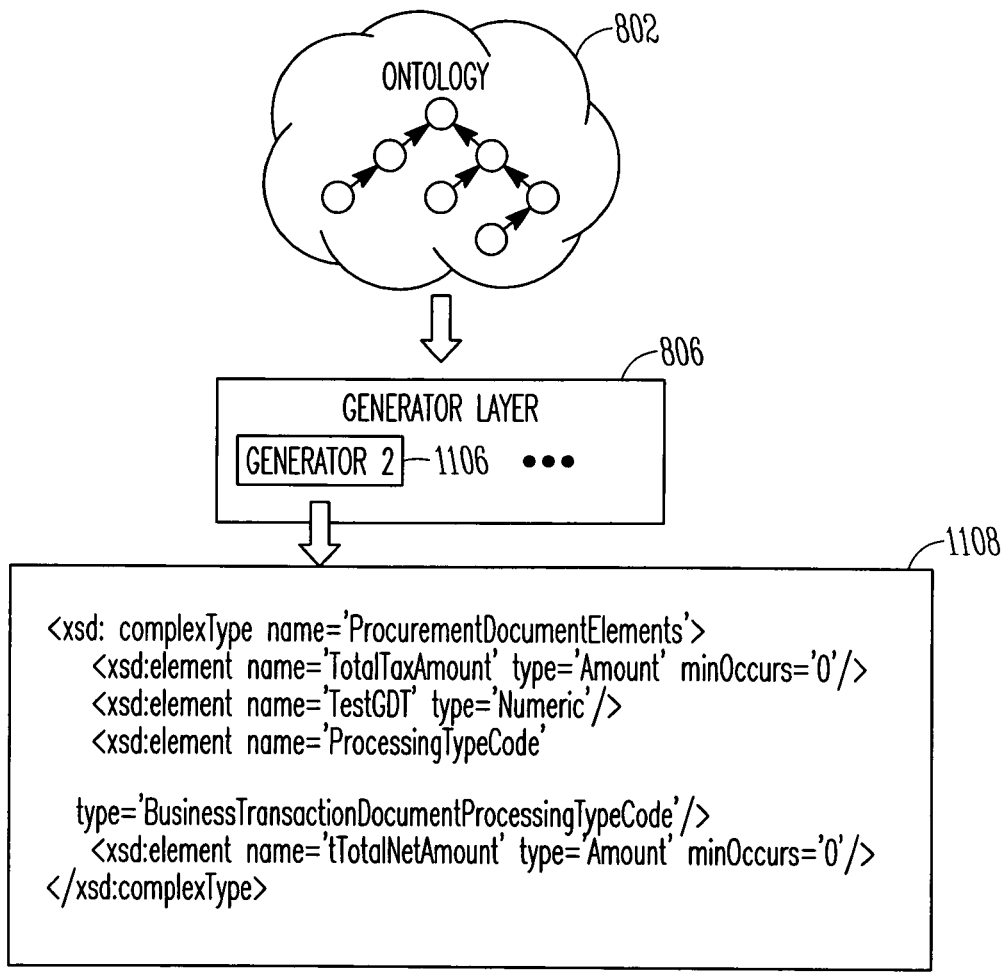
FIG. 12 is a diagrammatic representation showing a second type of generator, according to an example embodiment, that may be included within the generator layer.

FIG. 12 is a diagrammatic representation showing a second type of generator 1106 that may be included within the generator layer 806. The generator 1106 operates to create XML schema representations from the ontology 802. This translation may be facilitated where the ontology 802 and the desired output XML schema share some modeling primitives (e.g., subclasses and specialization).

Operationally, the generator 1106 receives as input the ontology 802, as well as an identifier of a class to be translated in the XML schema. Thereafter, the generator 1106 reads the class identified by the identifier, as well as its properties, constraints and restrictions, and then translates these properties, constraints and restrictions in XML schema.

Turning now to the translation, only some of the modeling primitives of the ontology 802 can be translated into XML schema, among them subclass relationship, properties and cardinality restrictions. These are translated one to one in the XML schema. Following completion of the translation, an XML schema 1108 is outputted by the generator 1106. The outputted XML schema 1108, shown in FIG. 12, is the output for a class "Procurement Document Element."

Source code for the generator 1106, according to an example embodiment, is as follows:

```
import java.io.*;
import java.util.*;
import de.fzi.sapbo.content.*;
public class XSD2OWLConverter {
    public static void main(String[ ] args) {
            // alle Dateinamen in gegebenem Ordner ermitteln
            String directoryName="C:\\AW\\projects\\sap_bo\\gdts";
        PrintStream out = System.out;
        TranslateValuesToXML xsd2owl=new
TranslateValuesToXML("GDTsWithOnlySimpleTypes");
        //TranslateValuesToXML xsd2owlCombined=new
TranslateValuesToXML("GDTsWithCombinedTypes");
        TranslateValuesToXML xsd2owlOneSimple=new
TranslateValuesToXML("GDTsWithOnlyOneSimpleType");
        TranslateValuesToXML xsd2owlOneSimpleCode=new
TranslateValuesToXML("GDTsWithOnlyOneSimpleTypeCode");
        TranslateValuesToXML xsd2owlcomplex[ ]=new
TranslateValuesToXML[7];
        for (int x=0;x<7;x++)
        {
            xsd2owlcomplex[x]=new
TranslateValuesToXML("GDTsWithComplexTypes-Part" +x);
            xsd2owlcomplex[x].setSAPContext( );
        }
        //xsd2owlCombined.setSAPContext( );
        xsd2owlOneSimpleCode.setSAPContext( );
        xsd2owlOneSimple.setSAPContext( );
```

-continued

```
xsd2owl.setSAPContext( );
File dir = new File(directoryName);
String[ ] children = dir.list( );
int counterOnlyOneSimpeTypeGDT=0;
int counterOnlyOneSimpeTypeGDTCode=0;
int counterOnlySimpleTypesGDT=0;
int counterCombinedTypes=0;
int complexCount=0;
int currentX=0;
if (children == null) {
    // Either dir does not exist or is not a directory
} else {
    //children.length
    for (int i=000; i<children.length; i++) {
        //if (i== 500) { i=700; }
        // Get filename of file or directory
        String filename = children[i];
        System.out.println("filename: " +filename);
        XSDParser xsdparser=new
XSDParser(directoryName+"\\"+filename);
        Vector simpleTypes=xsdparser.getVectorSimpleTypes( );
        System.out.println("simpletypes: " +simpleTypes.size( ));
        // to do: complexTypes
        Vector complexTypes=xsdparser.getVectorComplexTypes( );
        String XsdSchemName=filename.substring(0,
        filename.indexOf("."));
        System.out.println("xsdSchemaName: " +XsdSchemName);
        if (simpleTypes.size( )== 1 && complexTypes.size( ) == 0 )
        {
            // Unterscheidung nach Annotation
            SimpleType st=(SimpleType)simpleTypes.elementAt(0);
            //System.out.println("st: " +st.getName( ));
            String annotation="";
            try
            {
                annotation=st.getAnnotation( );
            }
            catch(Exception e){
                annotation="";
            }
            System.out.println("annotation: " +annotation);
            if (annotation != null && annotation.equals("Code"))
            {
                xsd2owlOneSimpleCode.addNewClass(XsdSchemName,
simpleTypes, null);
                counterOnlyOneSimpeTypeGDTCode++;
            }
            else
            {
                xsd2owlOneSimple.addNewClass(XsdSchemName,
simpleTypes, null);
                counterOnlyOneSimpeTypeGDT++;
            }
        }
        if (simpleTypes.size( )> 1 && complexTypes.size( ) == 0)
        {
            xsd2owl.addNewClass(XsdSchemName,
            simpleTypes, null);
            counterOnlySimpleTypesGDT++;
        }
        if (simpleTypes.size( ) >= 0 && complexTypes.size( ) > 0)
        {
            complexCount++;
            if (complexCount == 70)
            {
                currentX++;
                complexCount=0;
            }
            //if (complexCount > 200 && complexCount < 290)
            //{
                xsd2owlcomplex[currentX].addNewClass-
(XsdSchemName, simpleTypes, complexTypes);
                //complexCount++;
            //}
            counterCombinedTypes++;
        }
    }
}
//xsd2owlCombined.writeAll( );
    xsd2owlOneSimpleCode.writeAll( );
    xsd2owlOneSimple.writeAll( );
        xsd2owl.writeAll( );
    for (int x=0;x<7;x++)
    {
        xsd2owlcomplex[x].writeAll( );
    }
    System.out.println("\n\nSummary:");
    System.out.println("Sum All GDTs           : " +children.length);
    System.out.println("GDTs with Only one Simple Type - Code    : "
+counterOnlyOneSimpeTypeGDTCode);
    System.out.println("GDTs with Only one Simple Type - Other   : "
+counterOnlyOneSimpeTypeGDT);
    System.out.println("GDTs with Only Simple Types
    (more than one) : "
+counterOnlySimpleTypesGDT);
    System.out.println("GDTs with Simple and Complex Types       : "
+counterCombinedTypes);
    // XSD2OWL xo=new XSD2OWL(args[0]);
    }
}
```

In summary, various example embodiments may provide features as discussed below. The example embodiments propose an ontology based on a logical language, and accordingly provide for automatic consistency checks and other reasoning tasks (e.g., tasks that may require manual coding). Furthermore, the example embodiments may allow for the application of reasoners that allow for flexibility in responding to queries, without the need for coding of individual and specific queries. Furthermore, certain embodiments enable the automatic generation of derivative information sources from an ontology for the sake of consistent documentation and access.

Modules, Components and Logic

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiples of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
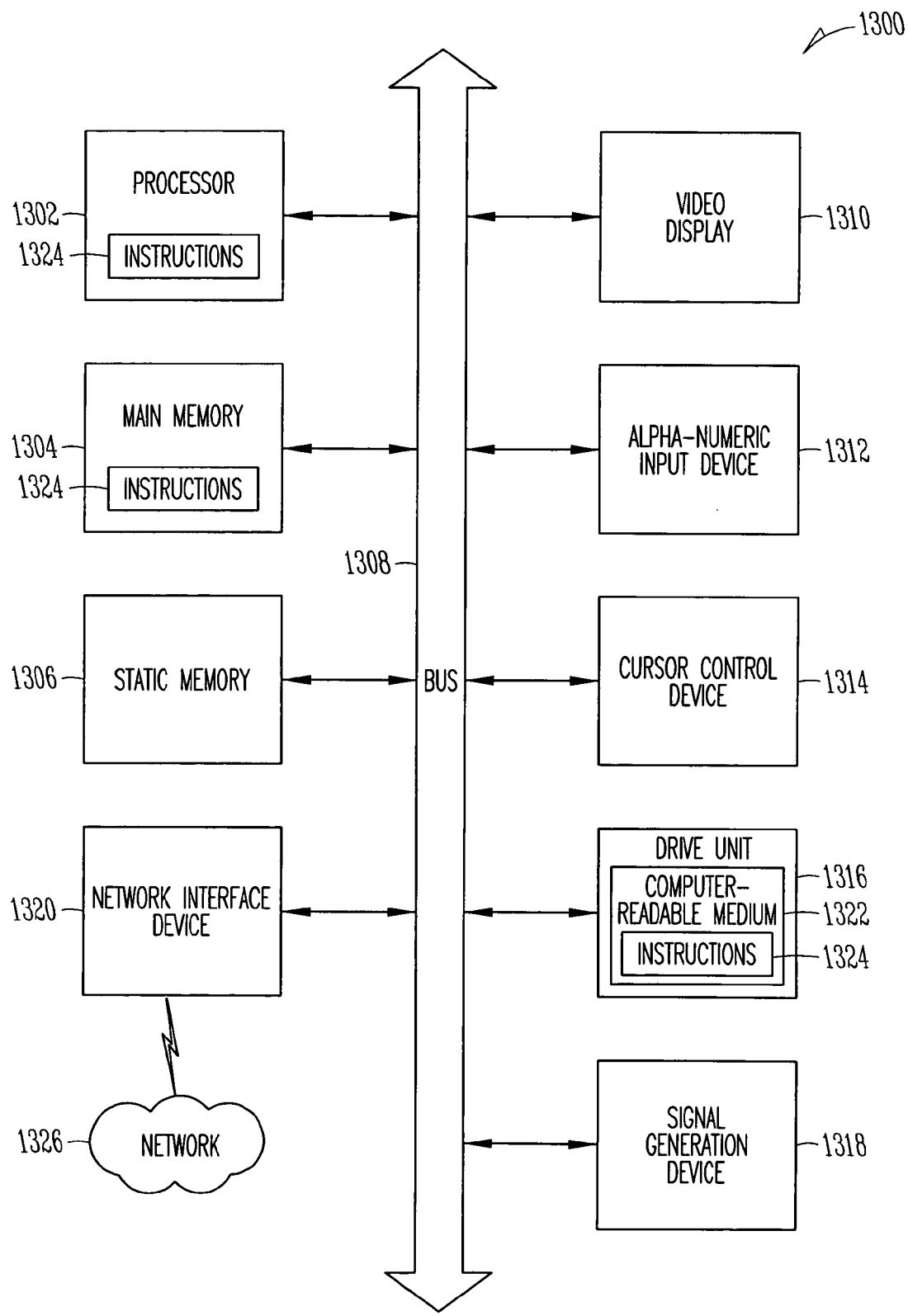
FIG. 13 is a block diagram of machine in the example form of a computer system within which a set instructions for causing the machine to perform any one or more of the methodologies discussed herein may be executed.

FIG. 13 is a block diagram of machine in the example form of a computer system 1300 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), and a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a cursor control device 1314 (e.g., a mouse), a disk drive unit 1316, a signal generation device 1318 (e.g., a speaker) and a network interface device 1320.

Computer-Readable Medium

The disk drive unit 1316 includes a computer-readable medium 1322 on which is stored one or more sets of instructions and data structures (e.g., instructions 1324) embodying or used by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the computer-readable medium 1322 is shown in an example embodiment to be a single medium, the term "computer-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices;

magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third tier, a storage tier, may be a persistent storage medium or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology or a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), JavaBeans (JB), Enterprise JavaBeans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems, may for example include five layers comprising: an application layer, a transport layer, a network layer, a data link layer, and a physical layer. In the case of software, for instantiating or configuring components having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, "internet" refers to a network of networks. These networks may use a variety of protocols for the exchange of data, including the aforementioned TCP/IP, and additionally Asynchronous Transfer Mode (ATM), Systems Network Architecture (SNA), SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method to generate a plurality of derivative information sources for a software development platform, the method comprising:
    defining an ontology to provide a logic-based representation formalism of each of a plurality of original information sources, the plurality of original information sources having heterogeneous representation formalisms;
    transforming, using a processor of a machine, the plurality of original information sources to the ontology by integrating information of each original information source of the plurality of original information sources into the ontology; and
    automatically generating the plurality of derivative information sources from the ontology including automatically generating a derivative information source of the plurality of derivative information sources in response to a request to generate the derivative information source and outputting the plurality of derivative information sources in respective formats, the plurality of derivative information sources corresponding to and being derivatives of the plurality of original information sources.

2. The method of claim 1, wherein the transforming includes automatically transforming a first original information source of the plurality of original information sources.

3. The method of claim 2, wherein the transforming of the first original information source to the ontology comprises using an ontology adapter to extract first original information from the first original information source and to integrate the first original information as a first derivative information into the ontology.

4. The method of claim 2, wherein the transforming of the first original information source comprises using a parser to extract the first original information as structural information only from the first original information source, and to provide the structural information to the ontology adapter.

5. The method of claim 1, wherein the transforming of a first original information source of the plurality of original information sources comprises using an interface module to provide a programmatic interface to an ontology adapter, the programmatic interface enabling the ontology adapter to programmatically extract first original information from the first original information source.

6. The method of claim 1, wherein the transforming includes manually transforming a second information source of the plurality of original information sources.

7. The method of claim 6, wherein the manual transformation of the second original information source comprises representing natural language statements by logical formulae.

8. The method of claim 1, wherein the automatic generating includes generating a first derivative information source of the plurality of derivative information sources on demand responsive to a request received from a component of the software development platform.

9. The method of claim 1, wherein the automatic generating includes automatically generating, using a first type of a first generator dedicated to a first type of derivative information source, the first type of derivative information source of the plurality of derivative information sources.

10. The method of claim 1, wherein the plurality of derivative information sources comprises a plurality of types of information sources, and the generating of the plurality of derivative information sources is performed by a plurality of generators, each of the plurality of generators being dedicated to a respective type of information source.

11. The method of claim 1, including using a description logic reasoner to perform a consistency check with respect to the ontology.

12. The method of claim 1, including receiving a query against the ontology, and using a logic reasoner to process the query against the ontology.

13. A system to generate a plurality of derivative information sources for a software development platform, the system comprising:
    one or more processors;
    an ontology adapter in communication with the one or more processors, the ontology adapter to adapt a plurality of original information sources to an ontology through integration of information of each original information source of the plurality of original information sources into the ontology, the ontology to provide a logic-based representation formalism of each of the plurality of original information sources, and the plurality of original information sources having diverse representation formalisms; and a plurality of generators in communication with the one or more processors, the plurality of generators to automatically generate the plurality of derivative information sources from the ontology including to automatically generate a derivative information source of the plurality of derivative information sources in response to a request to generate the derivative information source and output the plurality of derivative information sources in respective formats, the plurality of derivative information sources corresponding to and being derivatives of the plurality of original information sources.

14. The system of claim 13, wherein the ontology adapter is to extract first original information from a first original information source from the plurality of original information sources and to integrate first original information as first derivative information into the ontology.

15. The system of claim 14, including a parser to extract the first original information as structural information only from the first original information source, and to provide the structural information to the ontology adapter.

16. The system of claim 14, including an interface module to provide a programmatic interface to the ontology adapter, the programmatic interface enabling the ontology adapter to programmatically extract the first original information from the first original information source.

17. The system of claim 13, wherein the plurality of generators are automatically to generate the plurality of derivative information sources on demand responsive to requests received from components of the software development platform.

18. The system of claim 13, wherein the plurality of generators include:
 a first generator dedicated to a first type of derivative information source, and automatically to generate the first type of derivative information source of the plurality of derivative information sources; and
 a second generator dedicated to a second type of derivative information source, and automatically to generate the second type of derivative information source of the plurality of derivative information sources.

19. The system of claim 13, wherein the plurality of derivative information sources comprises a plurality of types of information sources, and wherein each of the plurality of generators is dedicated to a respective type of information source.

20. The system of claim 13, including a description logic reasoner to perform a consistency check with respect to the ontology.

21. The system of claim 13, including a logic reasoner to process a query against the ontology.

22. A non-transitory, tangible machine-readable medium embodying instructions that, when executed by one or more processors, cause the one or more processors to perform a method to generate a plurality of derivative information sources for a software development platform, the method comprising:
 defining an ontology to provide a logic-based representation formalism of each of a plurality of original information sources, the plurality of original information sources having heterogeneous representation formalisms;
 transforming the plurality of original information sources to the ontology by integrating information of each original information source of the plurality of original information sources into the ontology; and
 automatically generating the plurality of derivative information sources from the ontology including automatically generating a derivative information source of the plurality of derivative information sources in response to a request to generate the derivative information source and outputting the plurality of derivative information sources in respective formats, the plurality of derivative information sources corresponding to and being derivatives of the plurality of original information sources.

23. A system to generate a plurality of derivative information sources for a software development platform, the system comprising:
 one or more processors;
 first means, in communication with the one or more processors, for adapting a plurality of original information sources to an ontology through integration of information of each original information source of the plurality of original information sources into the ontology, the ontology to provide a logic-based representation formalism of each of the plurality of original information sources, and the plurality of original information sources having diverse representation formalisms; and
 second means, in communication with the one or more processors, for automatically generating the plurality of derivative information sources from the ontology including automatically generating a derivative information source of the plurality of the plurality of derivative information sources in response to a request to generate the derivative information source and outputting the plurality of derivative information sources in respective formats, the plurality of derivative information sources corresponding to and being derivatives of the plurality of original information sources.

* * * * *